(12) United States Patent
Khoury et al.

(10) Patent No.: US 11,909,777 B2
(45) Date of Patent: Feb. 20, 2024

(54) METHOD AND SYSTEM FOR INITIATING A MOBILE VOICE CALL

(71) Applicant: WONE SAGL, Lugano (CH)

(72) Inventors: David Jean Khoury, Stockholm (SE); Joseph Selim Ged, Beirut (LB); Elie Fares Kfoury, North Metn (LB)

(73) Assignee: WONE SAGL, Lugano (CH)

( * ) Notice: Subject to any disclaimer, the term of this patent is extended or adjusted under 35 U.S.C. 154(b) by 399 days.

(21) Appl. No.: 17/416,140

(22) PCT Filed: Dec. 18, 2019

(86) PCT No.: PCT/EP2019/086050
§ 371 (c)(1),
(2) Date: Jun. 18, 2021

(87) PCT Pub. No.: WO2020/127553
PCT Pub. Date: Jun. 25, 2020

(65) Prior Publication Data
US 2022/0078216 A1   Mar. 10, 2022

(30) Foreign Application Priority Data
Dec. 21, 2018  (EP) ..................................... 18215134

(51) Int. Cl.
*H04L 65/1104* (2022.01)
*H04L 65/1069* (2022.01)
(Continued)

(52) U.S. Cl.
CPC ...... *H04L 65/1069* (2013.01); *H04L 65/1104* (2022.05); *H04M 7/0033* (2013.01); *H04L 2101/65* (2022.05)

(58) Field of Classification Search
CPC ............. H04L 65/1066; H04L 65/1069; H04L 65/1076; H04L 65/1094; H04L 65/1096;
(Continued)

(56) References Cited

U.S. PATENT DOCUMENTS 7,822,188 B1 * 10/2010 Kirchhoff ........... H04L 65/1096
379/211.02
2008/0153480 A1   6/2008 Jiang
(Continued)

FOREIGN PATENT DOCUMENTS

EP   1952652 B1   6/2012
EP   3035627 A1   6/2016

OTHER PUBLICATIONS

International Search Report of corresponding PCT/EP2019/086050, dated Jan. 1, 2020, 2 pages.
(Continued)

*Primary Examiner* — Siu M Lee
(74) *Attorney, Agent, or Firm* — Tucker Ellis LLP

(57) ABSTRACT

Provided is a method for initiating a mobile voice call from a caller UE to a callee UE having a SIM card associated with a callee phone number, which callee phone number is a E.164 compliant MSISDN. The method includes providing a software function at the callee UE, which software function is associated with a receiving address comprising the callee phone number, and configuring a call forwarding function in a first network, being activated for the callee phone number and configured for forwarding CS voice calls to a forwarding phone number associated with a VOIP service. The method also includes the caller UE calling the callee phone number, the first network performing the call forwarding to the VOIP service, the VOIP service identify-
(Continued)

ing the callee UE, and the VOIP service initiating the call between the caller UE and the software function using the receiving address.

15 Claims, 10 Drawing Sheets

(51) Int. Cl.
*H04M 7/00* (2006.01)
*H04L 101/65* (2022.01)

(58) Field of Classification Search
CPC ............ H04L 65/1101; H04L 65/1104; H04L 2101/60; H04L 2101/604; H04L 2101/65; H04M 7/0033
See application file for complete search history.

(56) References Cited

U.S. PATENT DOCUMENTS

| | | | |
|---|---|---|---|
| 2009/0268726 A1* | 10/2009 | Buckley | H04L 65/1016 370/355 |
| 2011/0275367 A1 | 11/2011 | Citron et al. | |
| 2012/0163370 A1* | 6/2012 | Fiorante | H04M 3/4286 370/352 |
| 2014/0274086 A1* | 9/2014 | Boerjesson | H04L 65/1104 455/450 |
| 2016/0309034 A1 | 10/2016 | Li | |
| 2017/0163811 A1* | 6/2017 | Barkan | H04M 7/0033 |

OTHER PUBLICATIONS

International Preliminary Report on Patentability of corresponding PCT/EP2019/086050, dated Mar. 30, 2021, 21 pages.

* cited by examiner

METHOD AND SYSTEM FOR INITIATING A MOBILE VOICE CALL

The present invention relates to a method and a system for initiating a mobile voice call. In particular, it relates to such a method and such a system in which a caller originated regular mobile voice call or IP (Internet Protocol) voice call can be initiated for being performed over an IP (Internet Protocol) communication channel, seamlessly reaching a broad spectrum of different types of callees anywhere as long as one or several pieces of User Equipment (UE) of the callee is connected over the Internet IP cloud network.

Since many years, mobile systems support VOIP (Voice Over IP) telephone calls, where the actual sound data is communicated over an IP channel end-to-end (from a caller to a callee) rather than using the conventional CS (Circuit Switch) systems, using the 2G or 3G voice channel.

However, due to the wide variety and different coverage of protocols supported by different types of UE and networks, that may also differ between different pairs of UE wanting to make calls between one another, VOIP solutions remain largely restricted to proprietary applications connecting the pairs and have not caught on to as large degree as anticipated. One example is VoLTE (Voice over LTE), which is based on control by the IMS (IP Multimedia Subsystem), and which has not caught on despite being associated with relatively high service quality.

Many VOIP solutions rely on third party application providers, using IP for voice communication. Such solutions typically use their own address domain, such as proprietary user identifiers (virtual phone numbers, email addresses, etc.), instead of conventional MSISDN phone numbers. Even if some such solutions actually use the MSISDN as the user identifier, the VOIP communication still takes part over an IP channel which is specific for the service provider and performed in a proprietary manner completely isolated from the CS open connected networks. Hence, only users of the service in question can reach each other via such VOIP private applications. Also, there is in general no standard open connectivity, neither between CS and VOIP networks nor between VOIP networks.

In addition, the MSISDN of a particular UE can be used for seamless call initiation access irrespectively of if the user is currently in its HPLMN (Home Public Land Mobile Network) or if roaming. However, roaming is frequently costly for the user.

Consequently, there is a need for an inexpensive solution for initiating and performing mobile voice calls that does not require the caller as well as the callee to subscribe to a particular service, and that can be used as a part of the conventional mobile network system in a transparent manner.

US20110275367A and US20080153480A both disclose respective systems for performing call forwarding from a roaming cell phone to a VOIP channel.

EP3035627A1 discloses an automatic call forwarding function used when a mobile phone is out of network range.

EP1952652B1 discloses an automatic call forwarding method to a PS callee. The callee is a separate entity (such as a computer) than the mobile phone being called.

As compared to these prior art solutions, the present invention provides a simpler and more convenient user experience, and in particular in a way making it easy for a user to always be reachable by a caller in the most cost-efficient and convenient way possible.

Hence, the invention relates to a method for initiating a mobile voice call from a caller UE (User Equipment) to a callee UE, having a SIM (Subscriber Identity Module) associated with a callee phone number, which callee phone number is a E.164 compliant MSISDN of the SIM, which method comprises the following steps, performed ahead of the said call initiating: a) providing a software function arranged to execute on or from the callee UE, which software function is associated with a receiving address, which receiving address comprises the said callee phone number; and b) configuring a call forwarding function in a first network to which the callee UE subscribes, which call forwarding function is activated for the said callee phone number and configured for forwarding CS (Circuit Switch) voice calls to a forwarding phone number associated with a VOIP service, and wherein the method further comprises the following steps, performed in connection to the said call initiating: c) the caller UE calling the callee phone number; d) the first network performing said call forwarding, forwarding the call to said VOIP service using said forwarding phone number; e) the VOIP service identifying the callee UE based upon the forwarding phone number; and f) the VOIP service initiating the call between the caller UE and the said software function, using the receiving address.

Furthermore, the invention relates to a method for initiating a mobile voice call from a caller UE (User Equipment) to a callee UE, comprising the following steps: a) providing to the caller UE a software function arranged to execute on or from the caller UE; b) the caller, using said software function, selecting a callee phone number compliant with the phone number recommendation E.164; c) the caller UE communicating, to a SIP server, the callee phone number; d) the SIP server determining whether or not the callee phone number is associated with a callee UE for VOIP; e) if so, the SIP server identifying the callee UE using a SIP address the "user" field of which comprises the callee phone number, initiating the call between the caller UE and the callee UE as a VOIP call; and f) if not, the SIP server initiating the call between the caller UE and the callee UE as a CS call using the callee phone number and using a network switching function of a first network to which the callee UE subscribes.

Moreover, the invention relates to a system for initiating a mobile voice call from a caller UE (User Equipment) to a callee UE, which callee UE has a SIM (Subscriber Identity Module) associated with a callee phone number, which callee phone number is a E.164 compliant MSISDN of the SIM, which system comprises a software function, arranged to execute on or from the callee UE; and a VOIP service arranged to accept CS (Circuit Switch) voice calls forwarded to a forwarding phone number from a first network to which the callee UE subscribes to the VOIP service, wherein the software function is arranged to, when executing, automatically detect the callee phone number from said SIM, and thereafter automatically to provide the VOIP service with the callee phone number and/or a receiving address comprising the callee phone number, and wherein the VOIP service is arranged to identify the callee UE based upon the forwarding phone number, and to, as a result of this identification, initiate the call between the caller UE and the said software function, using the receiving address.

Also, the invention relates to a computer software function arranged for being executed on or from a callee UE (User Equipment), which callee UE has a SIM (Subscriber Identity Module) associated with a callee phone number, which callee phone number is a E.164 compliant MSISDN of the SIM, which software function is arranged to, when executing, perform the following steps: detect the callee phone number from said SIM, and then provide the VOIP service with the callee phone number and/or a receiving address comprising the callee phone number; and receive a forwarding phone number from the VOIP service, and then configure a call forwarding function in a first network to which the callee UE subscribes, which call for-warding function is activated for the said callee phone number and configured for for-warding CS (Circuit Switch) voice calls to the forwarding phone number.

In the following, the invention will be described in detail, with reference to exemplifying embodiments of the invention and to the enclosed drawings, wherein.

The Figures share the same reference numerals for same or corresponding parts.

Figure 1:
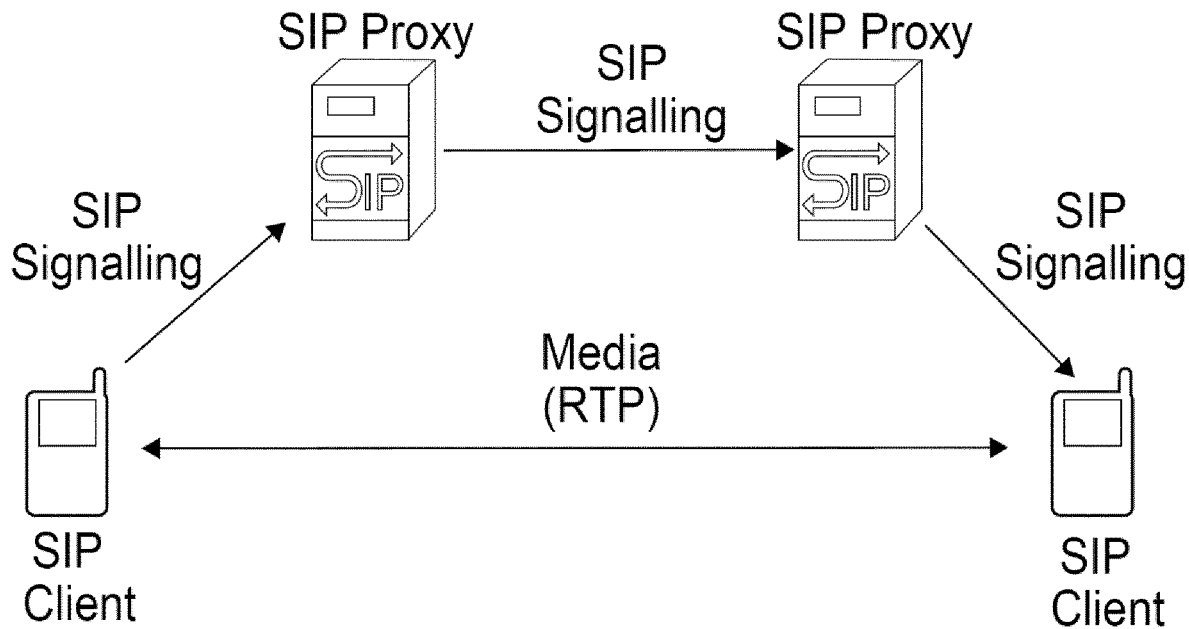
FIG. 1 shows a conventional SIP trapezoid architecture.

The deployment of Over-The-Top (OTT) Voice over IP (VOIP) applications has been accelerated after the adoption of high-speed communications technologies (such as LTE, Long-Term Evolution) by the mobile operators. Additionally, the high incurring costs imposed on mobile subscribers roaming outside their respective Home Public Land Mobile Network (HPLMN) has also contributed to the widespread coverage of OTT VOIP.

As a result, mobile operators are witnessing a dramatic drop in their Average Revenue per User (ARPU). Current OTT VOIP applications often have their own domain system and follow an addressing scheme based on virtual numbers or mail addresses. Moreover, the clients' requirements such as roaming and global reachability are not fulfilled. Hence, there is a need for a method and a system for initiating a mobile voice call, in which a caller-originated is regular mobile voice call or VOIP call can be initiated for being performed over an IP (Internet Protocol) communication channel, seamlessly reaching a broad spectrum of different types of callees (parties to which calls are directed) anywhere as long as a User Equipment (UE) of the callee in question is connected over the Internet IP cloud network.

The solution according to the present invention uses, among other things, a VOIP service and a software function arranged for being executed on or from the user equipment (UE) in question, which software function is assigned a real phone number according to the international telephony E.164 numbering plan. This real phone number may be its UE SIM card (Subscriber Identity Module) MSISDN. Incoming calls to a subscriber UE roaming outside of their HPLMN are substituted by a VOIP call with the help of a call forwarding feature.

Voice calls provided within a mobile telephony system (such as GSM or 3G) or a land line network are established through a Circuit Switch (CS) network, where the switching nodes in the network are used to connect the two end points of the call. This system architecture was adopted since the beginning of telephony and is applied in the mobile side in a network node called MSC (Mobile Switching Centre). The roaming solution, CS and Packet Switched (PS), deployed and specified by the GSMA (GSM Association), is complicated and costly. One of the main issues for the mobile users is the high cost of roaming outside their HPLMN. Even if the mobile operators are enjoying the high cost of roaming, the backside is that many clients are using alternative solutions for communications based on VOIP.

As a result, it has to date proven not feasible to have one single global phone number using which a user can be reachable everywhere in a simple and cost-efficient manner. The deployment of LTE high speed data has accelerated the deployment and the use of the OTT of VOIP applications, that dramatically have impacted the ARPU of the mobile operators and their business landscape. However, the existing OTT VOIP applications did not solve the main requirement of the user to be reached globally on their real phone number (MSISDN) provided by their Mobile Network Operator (MNO) or the Mobile Virtual Network Operator (MVNO), and the flexibility to be reached through the circuit switch using a conventional dialup interface (such as the default dialup interface of their UE) without the need of a dedicated application. Existing VOIP OTT applications typically have their own addressing domain, mainly based on virtual numbers, email addresses, etc.

The VOIP service in LTE is called VoLTE (Voice over LTE). It is controlled by the IP Multimedia Subsystem (IMS) profile standardized in GSMA IR.92. Similarly to VOIP, VoLTE is based on the Session Initiation Protocol (SIP). However, the VoLTE services have not yet reached the same level of geographic coverage as CS-voice, even though it offers several improvements in the Quality of Service (QoS) compared to OTT VOIP.

Many VOIP solutions rely on third party application providers, using IP for voice communication. Such solutions typically use their own address domain, such as proprietary user identifiers (virtual phone numbers, email addresses, etc.), instead of conventional MSISDN phone numbers. Furthermore, the VOIP communication typically takes part over an IP channel which is specific to the service provider in question and using proprietary protocols in a way which is completely isolated from the CS open connected networks. Hence, only the service's subscribers can reach each other via such VOIP private applications.

Consequently, there is a need for an inexpensive solution for initiating and performing mobile voice calls that does not require the caller as well as the callee to subscribe to a particular service, and that can be used as a part of the conventional mobile network system in a transparent manner. The present invention offers a way to bridge the CS and PS networks by using VOIP as the core communication engine for CS-based traditional voice telephony.

In particular, the present method and system offer global reachability through one global real phone number based on the E.164 standard, and can completely replace the existing 3GPP roaming function of CS voice calls.

One aspect of this solution is the use of a software function being associated with, such as comprising, a subscriber profile MSISDN which has been extracted from a SIM card delivered by the mobile operator and mapped to a SIP address provided by a VOIP service. For instance, this profile may be in the form of a pure software file, associated with said software function installed on for execution on, or being executed from, the UE. As will be clear from the following, the UE from or on which the software function executes may be a mobile phone or any other electronic equipment, such as a different mobile phone than the one carrying said SIM card; a laptop; a stationary computer; and so forth.

The software function may be a SIP client, or comprise or access/use SIP client functionality. Another aspect of this solution is the unconditional forwarding of calls to a predetermined destination VOIP service, which in turn is arranged to forward such calls to the software function of the UE.

The VOIP service may be a cloud-based service, a stand-alone or distributed VOIP server, or similar.

Hence, using the present invention the existing CS network can be bridged with the services provided by VOIP, to enable global reachability through one single real phone number. The roaming function of a CS voice call is replaced by a forwarding function of the call to a destination VOIP system, using said software function being associated with an MSISDN number in the form of actual real phone numbers provided by an MNO/MVNO.

BACKGROUND

This section provides a background on several technologies and concepts used in and by the invention.

A. Session Initiation Protocol (SIP)

SIP is a signalling protocol used in VOIP systems to setup, maintain, and terminate voice calls between terminal UEs. It is based on the IP protocol, and can be ported on top of both transport layer protocols UDP (User Datagram Protocol) and TCP (Transmission Control Protocol).

FIG. 1 depicts a typical SIP architecture, where SIP clients (UEs) establish a call by allowing SIP proxies (servers) to handle the signalling. The media payload (voice data) is then exchanged between the two clients directly, without going to the SIP server. Instead, the media typically goes to a media proxy which forwards the payload to the other end.

B. MSC/GMSC (Gateway MSC)

The MSC is a switching node that routes voice calls and SMS (Short Message Service) messages. Its primary purpose is to set up and release the connection between UEs in an end-to-end approach. Moreover, it handles mobility and handover requirements during the call.

Figure 2:
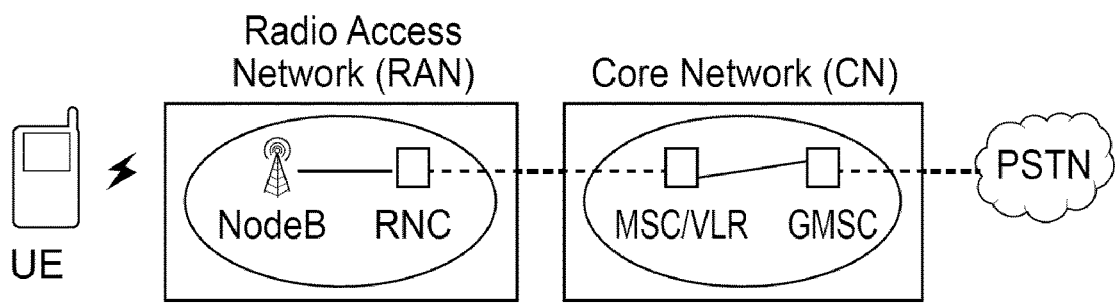
FIG. 2 shows a conventional operator's network architecture.

FIG. 2 shows a conventional operator's network architecture (according to 3G UMTS R99).

The GMSC is a node responsible for interfacing the PSTN (Public Switched Telephone Network). All calls between mobiles and PSTN are routed through this node.

C. DID (Direct Inward Dial)

Direct inward dialling is a feature of a telephone network that allows subscribers to connect to their own Private Branch Exchange (PBX) using trunk lines. In a VOIP environment, DID numbers are usually assigned to a gateway, providing users of the public switched telephone network (PSTN) the ability to directly reach users with VOIP phones.

Figure 3A:
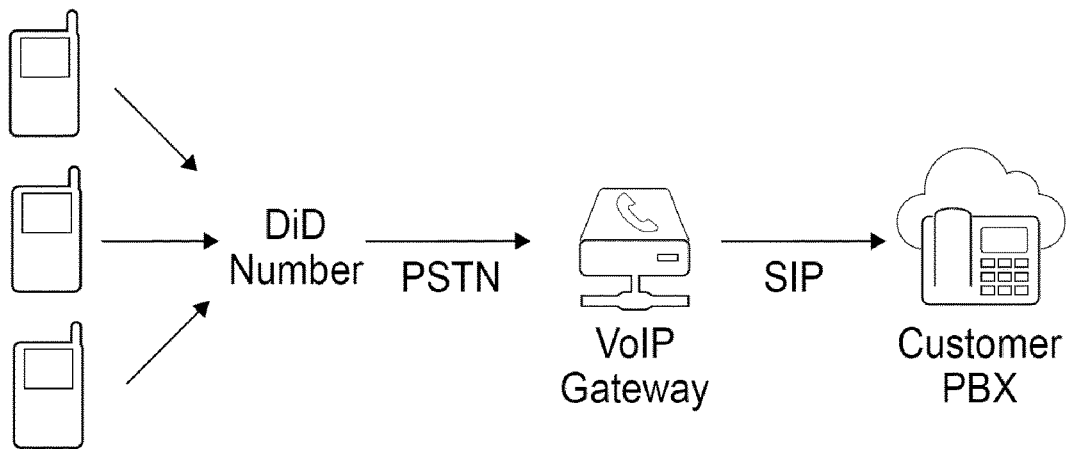
FIGS. 3a, 3b and 3c show conventional VOIP DID Scenario Architectures.
Figure 3B:
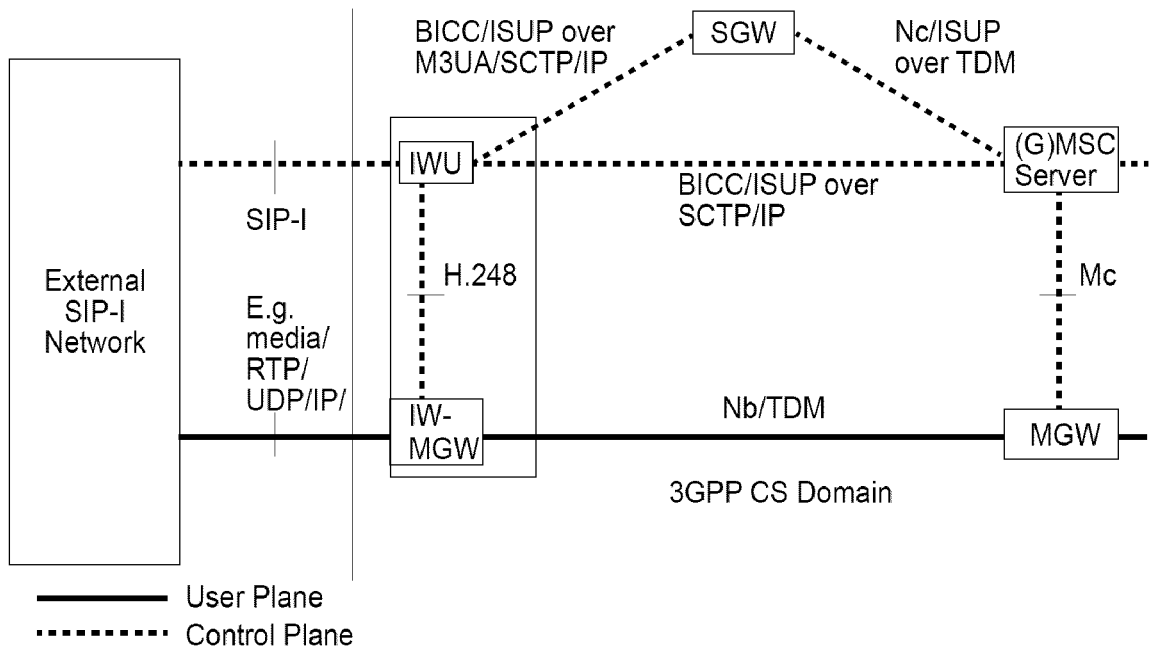
Figure 3C:
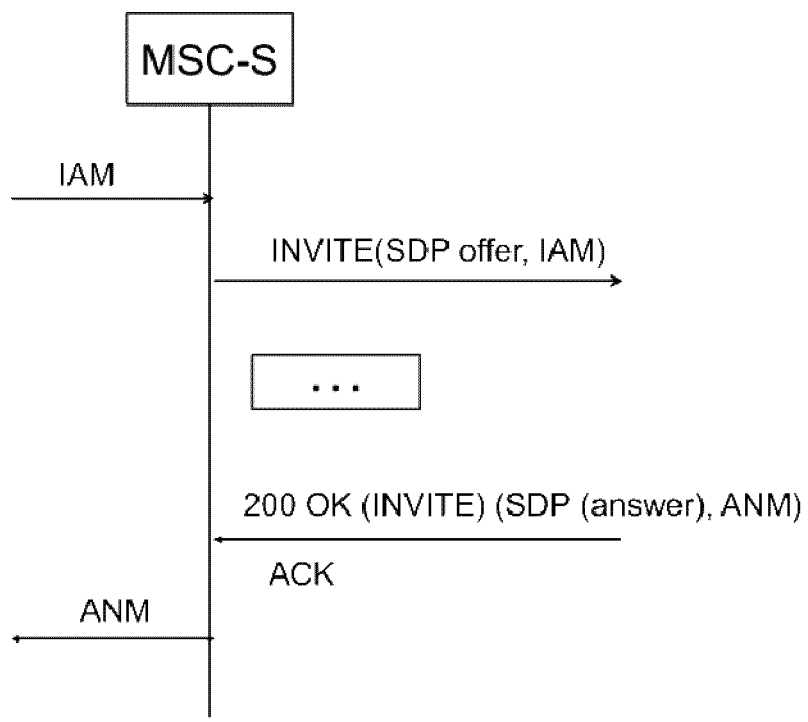

FIGS. 3a, 3b and 3c shows a typical VOIP DID Scenario Architecture. As shown in this Figure, a UE in the form of a mobile phone calling a DiD number will be redirected to the VOIP gateway through the PSTN network. Afterwards, the VOIP gateway typically routes the call to a customer PBX.

D. SBC (Session Border Controller)

SBC is a device deployed on the border of a VOIP network, to convert the signalling protocols between CS and PS communicating units and interfacing the CS network. It may comprise a SIP proxy and a media proxy. An SBC is responsible for maintaining the full session state and may also offer additional features such as security, Quality of Service (QoS), regulatory, media services (transcoding, DTMF relay, etc.), and so forth.

E. CS and PS Interworking

The interworking between the CS network and the VOIP system is based on the protocol SIP-I/T, according to the standard RFC 3398, specifying scenarios where a SIP call involves interworking with the PSTN. It maps the SIP signalling and the Integrated Services Digital Network (ISDN) User Part (ISUP) of the Signalling System No. 7 (SS7) as shown in FIGS. 3b and 3c.

In addition to the protocol mapping, the complete ISUP message is also transferred (encapsulated). It is assumed that the receiving SIP user agent can process ISUP.

F. SIP Trunking

Figure 4:
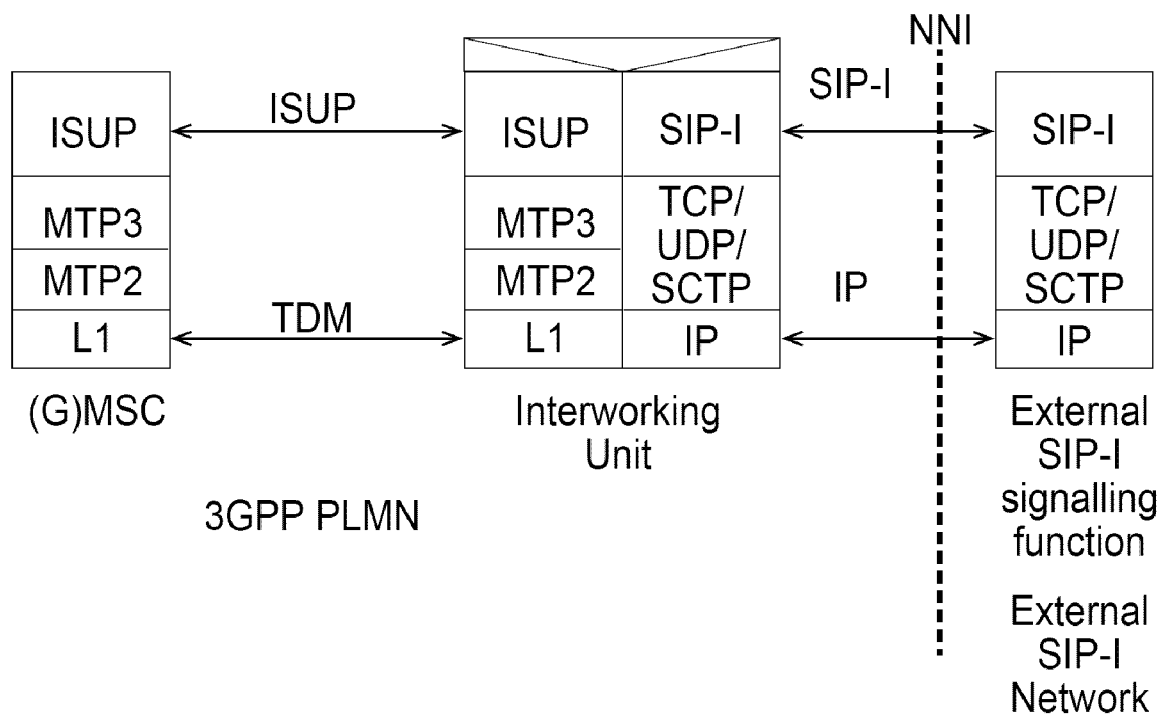
FIG. 4 illustrates conventional SIP trunking.

SIP Trunking enables the connection of the SIP-based private branch exchange (IP-PBX) to Internet telephony service providers (ITSPs). This is illustrated in FIG. 4.

Exemplifying Embodiments of the Invention

Figure 5:
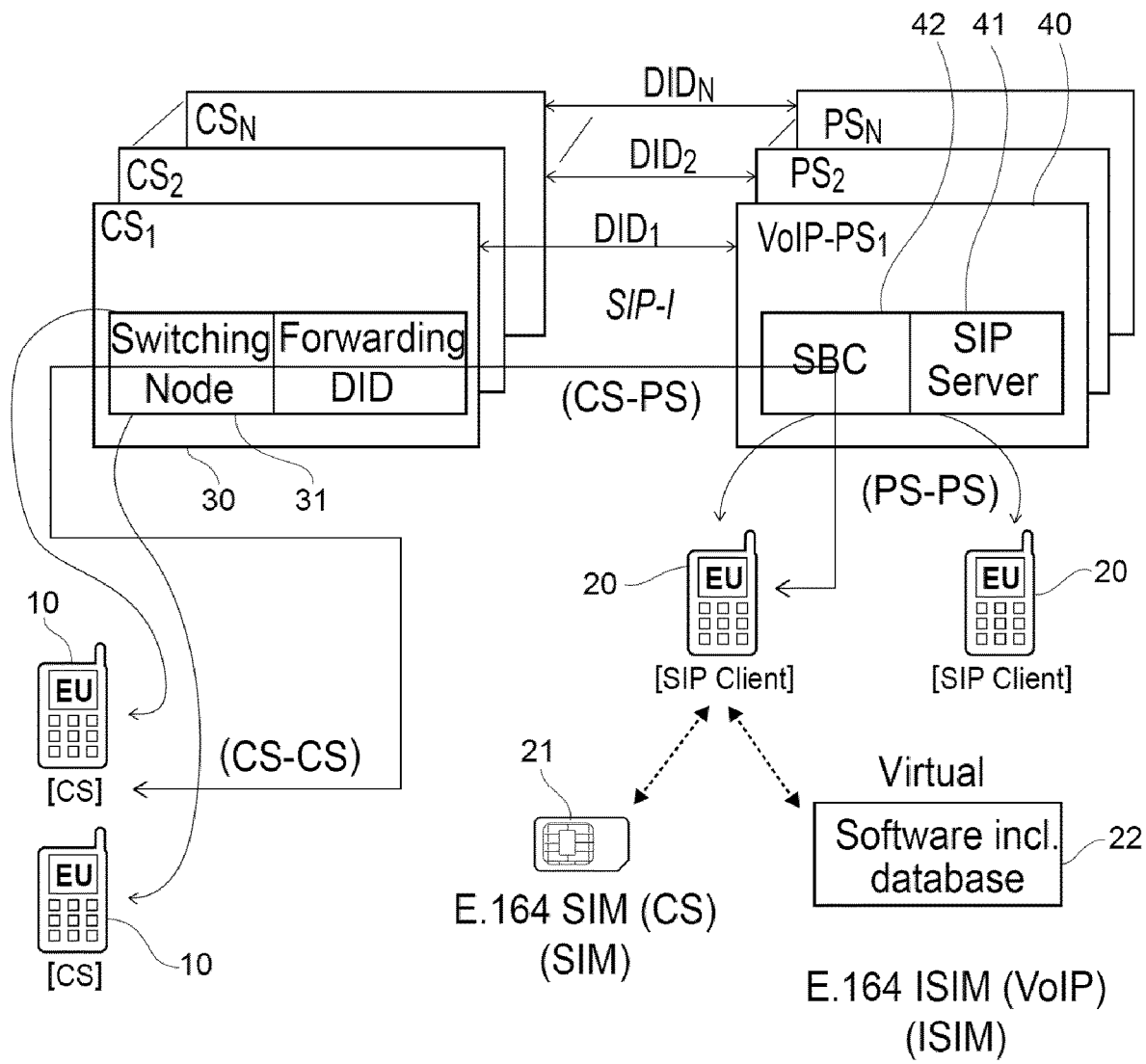
FIG. 5 illustrates a system according to the present invention in a first view.
Figure 6:
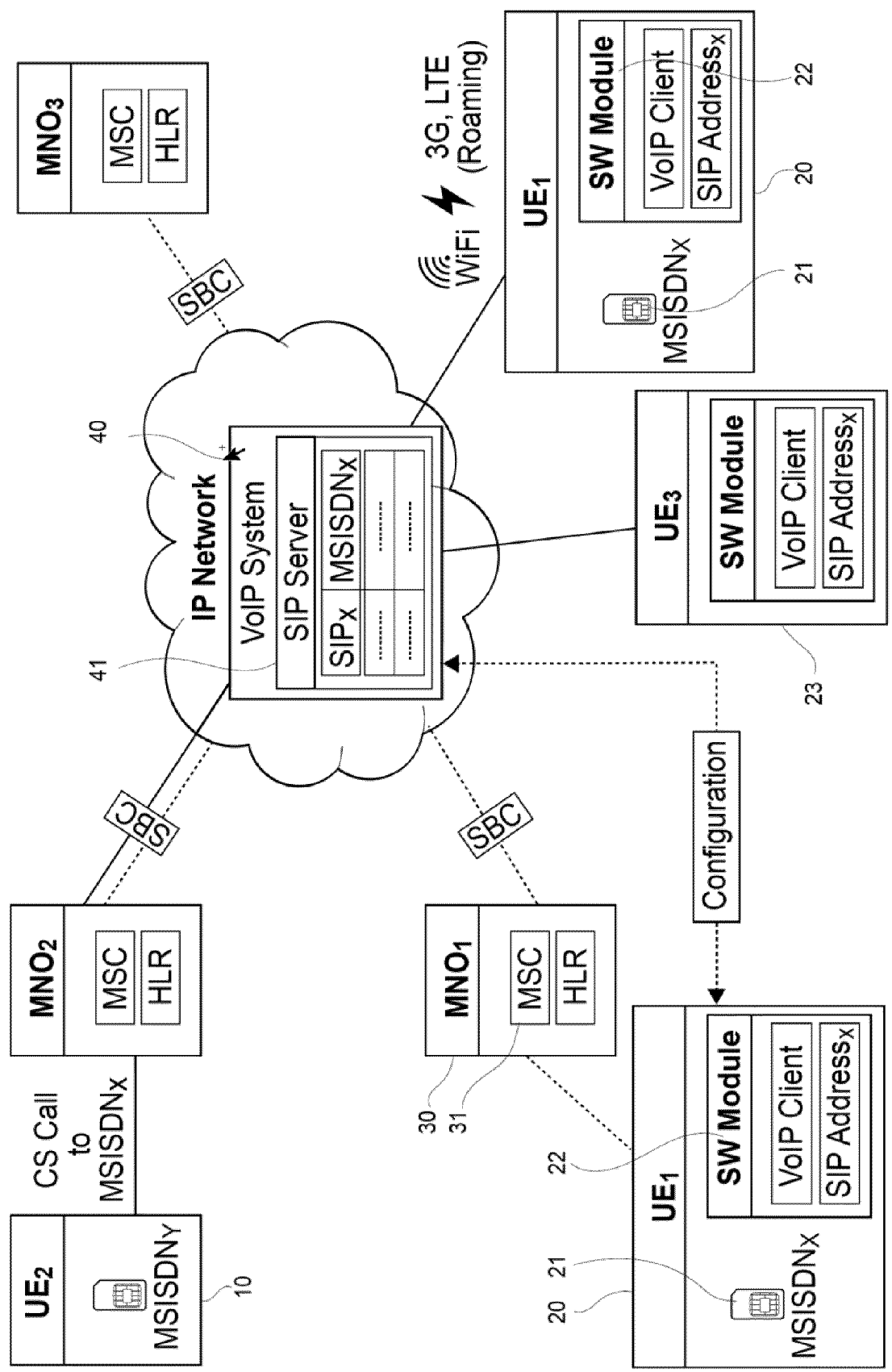
FIG. 6 illustrates the system according to the present invention in a second view.

FIGS. 5 and 6 illustrate, in two different views, a system according to the invention. The system comprises at least a software function 22 arranged to execute on or from a callee UE 20. The system also comprises a VOIP service 40, arranged to cooperate with the said software function 22.

The software function 22 may be arranged to execute on or from several callee UE's 20, and in addition on or from one or several caller UE 10, as the case may be. A callee UE 10 can also take the role as a caller UE 20, depending on who makes a voice call to be handled using the system.

That the software function 22 is arranged to execute "on or from" a UE 10, 20 means that it is arranged to be executed as an installed software application on the UE 10, 20 in question, that it is arranged to be executed remotely (such as on a server communicating with the UE 10, 20 in question over the Internet), or any combination between the two. What is important is that the software function 22, when executing in a callee UE 20 according to a method of the present invention, has communication and/or data access to a SIM card 21 physically installed in the UE 10, 20 in question, for reading an MSISDN of the UE as defined by the SIM card 21.

In a certain sense, the software function 22 will act as a "virtual SIM" of the UE 10, 20, in particular for PS voice calls, which will be understood in further detail from the description below.

The software function 22 may comprise a so-called "softphone" (a SIP client), which is connected to the Internet through any means of connectivity (WiFi, LTE, etc., via the SIM card 21 or independently of any SIM card 21). It is arranged to connect to the SIP server 41 through SIP signalling over IP. The software function may be arranged with functionality for setting up voice calls incoming and outgoing based on VOIP (SIP based). In general, a receiving address is assigned to the SIP client part of the software function 22 as the SIP address for the SIP client, which receiving address is registered and configured at the SIP server 41. As will be detailed below, the receiving address may comprise an MSISDN (E.164 standard) callee phone number associated with the SIM card 21.

FIGS. 5 and 6 also show an example of an additional physical device 23 (there may be several such additional physical devices 23); and a first mobile telephony network 30. The first network 30 comprises an MSC node 31. In FIG. 6, the additional physical device 23 is denoted "UE", but it is realized that this device 23 may be any type of device, such as a tablet computer, a laptop, a stationary computer, and so forth, and does not have to a 3GPP User Equipment.

The Mobile Switching Centre (MSC) 31 is a core component in a switching subsystem (NSS) of the first network 30. It handles network 30 switching functions, such as call management (setup and tear down), call forwarding and routing. Mobility and handovers are also handled by the MSC 31. The MSC 31 is connected to subscribers' databases and registers (EIR, AuC, HLR, and VLR, all being well-known acronyms to the skilled person within mobile telephony systems). The MSC 31 supports a conventional call forwarding function, which is a telephony feature that enables calls redirection to other destinations.

The signalling between the MSC 31 and the GMSC may be based on SS7/TDM.

The Gateway Mobile Switching Centre (GMSC), in turn, is used to route calls outside the first mobile network 30. When a subscriber UE originates/receives a call to/from outside the home land mobile network, the call is routed through the GMSC. The GMSC can be connected to the IP network, specifically to the Session Border Controller (SBC) 42 of the VOIP service 40, through SS7 or SIP with encapsulated ISUP (SIP-I).

The VOIP service 40 hence comprises an SBC 42, in addition to the SIP server 41.

The Session Border Controller (SBC) 42 is in general a device deployed on the border of a VOIP network, such as the VOIP service 40, to convert the signalling protocols between CS and PS communicating units. It generally comprises a SIP proxy and a media proxy. In the present system, the SBC 42 may preferably be a Communications Platform as a Service (CPaaS), of a type today widely available from reliable providers. Direct Inward Dialling (DID) numbers (see below) are assigned by such SBCs to specific countries and provided to subscribers. The SBC 42 is connected to SIP server 41 using SIP trunks.

The SIP Server 41 may be an SBC maintained by a company that provides customer profile for voice roaming free service/call forward status. Moreover, it is responsible for registering the SIP identities used in the present invention. The signalling is SIP-based, and the media is based on real-time protocol (RTP).

In a system according to the present invention, at least three modes of communication are supported:
1) CS-CS: In this the most trivial of these three modes, the caller UE 10 and the callee UE 20 are both connected to the same operator's network 30. Then, an initiated call is forwarded locally through the MSC 31 of this network 30. This may, for instance, be the case when the below described forwarding of calls is not activated when a callee UE 20 is not roaming.
2) PS-PS: This mode enables devices with said software function 22 of the callee UE 10 to communicate directly with the caller UE 20, via the Internet. Then the respective SIP client functionality of the respective software functions 22 are used to communicate voice payload data directly with each other over the PS channel, via the Internet.
3) CS-PS: In this mode, the caller UE 10 initiates a conventional CS call. The switching node 31 of the first mobile operator network 30 forwards the call to a specific SBC 42 to which the callee UE 20 is connected, as will be described in further detail below. The call is then forwarded to the software function of the callee UE 20.

It is noted that a fourth mode, PS-CS may also be supported, in cases where the callee UE is not PS-enabled but the caller UE still wishes to use the PS channel for the outgoing call. Then, the VOIP service 40 will route the incoming PS call as a CS call to the callee UE.

One key part of the system according to the present invention is the said software function 22. Each UE connected to a mobile network always contains a SIM card, which has been provided by the operator of the network in question. When executing on or from such a UE, the software function will comprise or have access to parameters conventionally stored on the SIM card, such as the IMSI and MSISDN of the SIM card in question, and SIM card encryption Keys, and so forth.

The mobile voice call in case of PS-PS between two software functions as described herein may be secured peer to peer. The secret keys for authentication confidentiality and integrity may then be generated by the software function, such as locally on the UE in question. These secret keys may then be used for user authentication, SIP registration and confidentiality between two peers according to protocols and algorithms that are as such well-knowns. As a result, the mobile operator has no access to the encryption keys in case of direct PS-PS communications between devices using their respective software functions.

The software function 22 may comprise or have access to a database, such as a software file stored on the UE in question, such as encrypted or otherwise securely stored, which database is accessible by the SIP client part of the software function 22. In this database, the subscriber profile MSISDN of the SIM card installed in the UE on or from which the software function is arranged to execute may be stored, after the software function, when executing, has automatically extracted this information from the SIM card in question.

In the said database may furthermore be stored the said receiving address, and/or mapping information between said MSISDN and said receiving address. In FIG. 6, the database is denoted "SIP Address".

When the software function 22 is provided for execution on or from more than one UE of a particular user of the present system, the information in said database may be replicated into the respective software function provided for being executed on or from each such UE. This way, the user in question may use any one of said UEs for making and/or receiving voice calls in a seamless manner, as will be described below.

Hence, in a system and a method according to the present invention, the role of the SIM card 21 is primarily to authorize the UE 20 in question to access the radio resources of the first network 30, and to provide user services like voice and/or data communication over is the mobile telephony network 30. As is conventional as such, the SIM card 21 is identified to the network 30 by its IMSI and MSISDN, the latter being a "real" phone number, according to the E.164 format standard.

Hence, in a way each UE being provided with said software function comprises two different SIM:s—the conventional SIM card 21, being provided according to 3GPP standard and providing access to the radio network and to mobile services offered by the network operator; and a "software SIM" represented by the information in the said database, being associated with the software function 22 and providing the software function 22 with sufficient information for registering the UE with the VOIP service 40 for setting up IP voice calls via the VOID service 40.

In some embodiments, the receiving address stored in the said database comprises or is a "real" phone number, in the sense that it follows the E.164 standard and may preferably be a phone number actually provided by the first network 30 operator. It is, however, realized that more than one such "virtual SIM", in the form of respective databases accessible by the respective software function 22 provided for execution on or from the UE in question, can be provided to one and the same UE but with different E.164 phone numbers for different respective receiving addresses. Also, the same database information can be provided to different UEs.

This way, the said "virtual SIM" behaves much as a conventional, physical SIM card, in that it provides access to voice call services to a particular UE on which it is active, while at the same time being arranged to be active on several different UE at the same time (such as in different executing instances) and also to be active as several separate "virtual SIMs" on one and the same UE (again such as different executing instances).

A UE with such a "virtual SIM" will generally have an active subscription with the VOIP service 40, based on the information in the said database. Hence, for UE:s having a physical SIM card 21, the UE will generally be associated with two distinctly different subscriptions—a first subscription with the CS first network 30 operator and a second subscription with the VOIP service 40 operator.

Herein, a "CS-enabled" UE will denote a UE not provided with the said software function, but arranged to receive and initiate CS voice calls. Correspondingly, a "PS-enabled" UE will denote a UE provided with the said software function, hence arranged to receive and initiate PS voice calls via the VOIP service 40 (and possibly also the receive and initiate CS voice calls, if the PS-enabled UE has a physical SIM card 21 installed therein).

Figure 7:
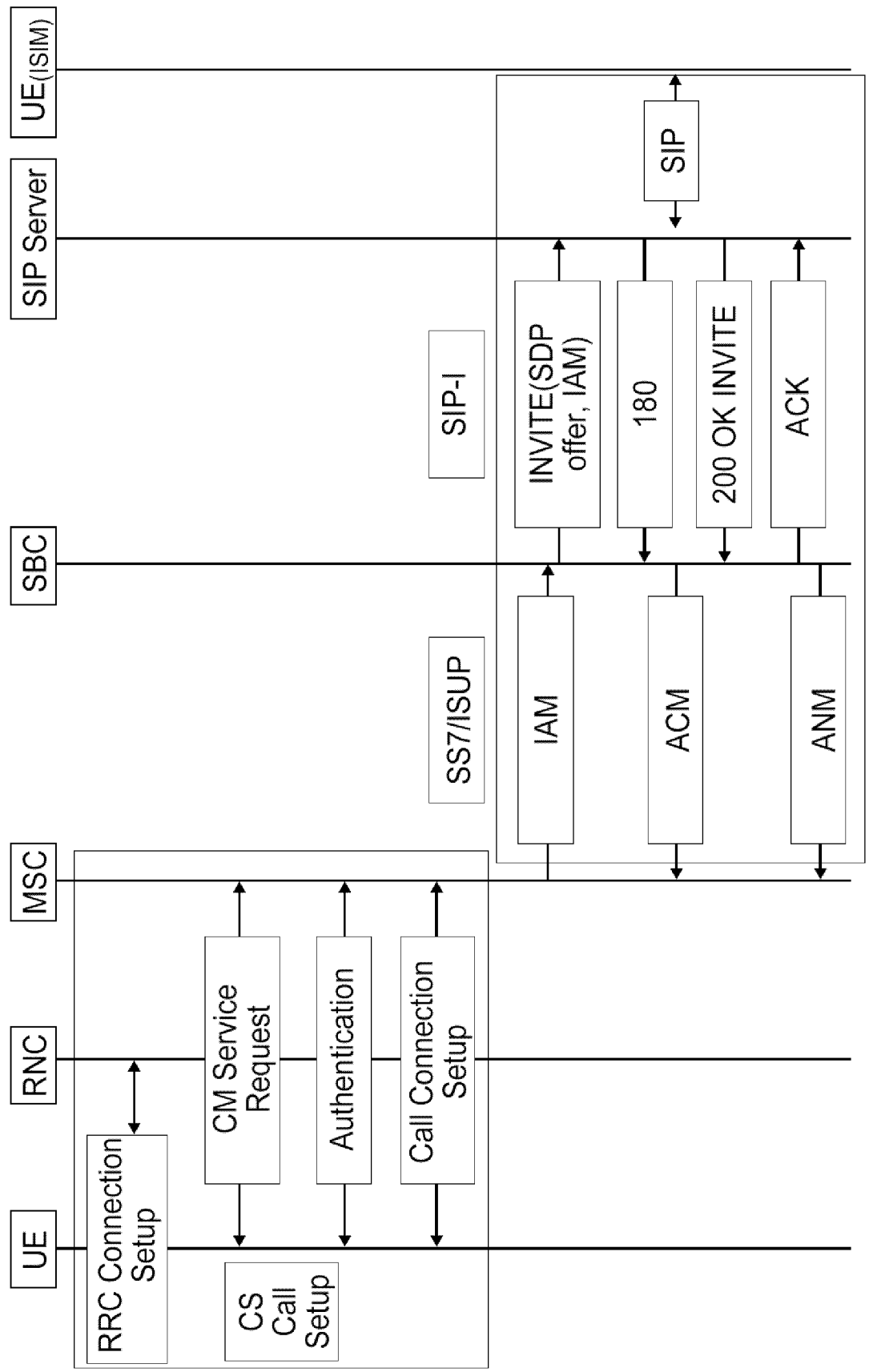
FIG. 7 is a first sequence diagram of a first method according to the present invention, for initiating a voice call.
Figure 8:
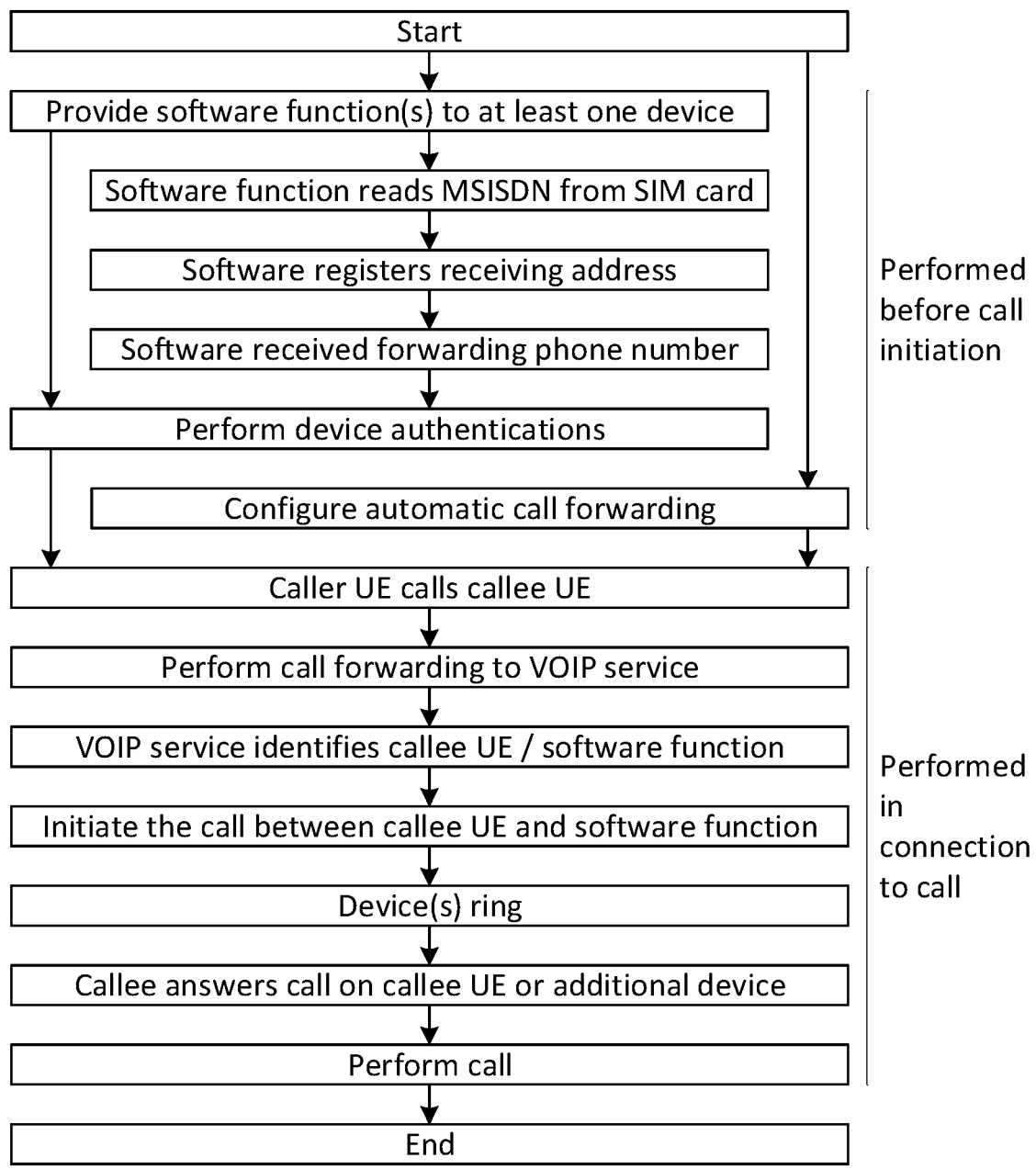
FIG. 8 is a second sequence diagram of said first method.

FIGS. 7 and 8 illustrate a first method according to the invention, for initiating a voice call from a CS-enabled caller UE 10 to a PS-enabled callee UE 20.

Outgoing PS calls from the caller UE 10 are controlled by the MSC of the mobile network to which the caller UE 10 is connected for radio access.

In case the callee destination phone number dialled by the caller UE 10 is to the callee UE 20, and the below-described call forwarding is activated in the first network 30, the MSC 31 of the first network 30 automatically forwards the call control to the SIP server 41 of the forwarding destination VOIP service 40. The role of the MSC 31 hence becomes that of a forwarding node and a gateway to the SIP server 41.

It is noted here that the caller UE 10 initiates the call setup to the callee UE 20 using the normal CS dial-up user interface of the caller UE 10, without the need for a dedicated application such as the mentioned software function. In the case described below in which the user of the callee UE 20 has activated one or several DID numbers with the VOIP service 40, the call is routed from the MSC 31 to the SBC 42, which then forwards it to the SIP server 41.

The SIP server 41 thereafter forwards the call to the SIP client part of the software function executing on or from the callee UE 20, and is setup as a combined CS voice call (caller UE 10 leg) and PS voice call (callee UE 20 leg).

Figure 9:
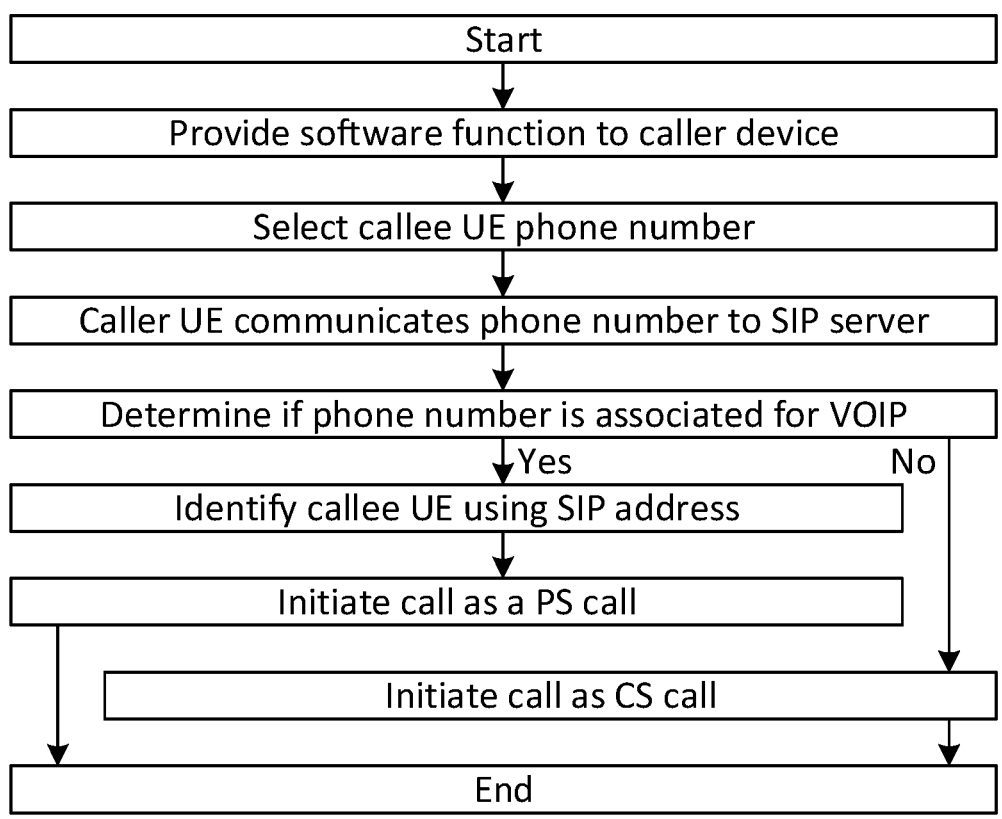
FIG. 9 is a sequence diagram of a second method according to the present invention.

As mentioned, FIG. 9 also illustrates this method, which is a method for initiating a mobile voice call from the CS-enabled caller UE 10 to the PS-enabled callee UE 20. The callee UE 20 has a SIM card 21 associated with a particular callee phone number, in turn being a number which is a E.164 compliant MSISDN of the SIM card 21 in question.

In a first step, the method starts.

In a subsequent series of substeps, performed ahead of the said call initiating, a first such substep comprises the said software function is provided as a software function 22 of the above described type, being arranged to execute on or from the callee UE 20. The software function 22 is associated with the said receiving address of the callee UE 20, which receiving address comprises the said callee phone number.

In a subsequent such substep, an automatic call forwarding function is configured in the first network 30 to which the callee UE 20 subscribes, which call forwarding function is activated for the said callee phone number and configured for forwarding CS voice calls to a particular forwarding phone number associated with the VOIP service 40.

Then, in connection to the said subsequent call initiating, the following steps are performed:

In a first such subsequent step, the caller UE 10 calls the callee phone number, so as to initiate said voice call. This may be performed by the user of the caller UE 10 dialling the MSISDN of the callee UE 20 in the conventional way.

In a subsequent step, the first network 30 then performs the said call forwarding using said forwarding phone number, in effect forwarding the call to the said configured forwarding phone number. Since this forwarding phone number is associated with the VOIP service 40, the initiated CS phone call will hence automatically be directed to the VOIP service 40.

The VOIP service 40, receiving said CS phone call as its destination, in turn identifies the callee UE 20 based upon the forwarding phone number. This identification will be described below, and is generally based upon an association in the VOIP service 40 between the forwarding phone number and the callee UE 20 software function and/or its receiving address. Hence, the VOIP service 40 may be associated with a plurality of forwarding phone numbers, such as one such forwarding phone number per served callee UE.

In a subsequent step, the VOIP service 40 then initiates the call between the caller UE 10 and the said software function 22 of the callee UE 20, using the receiving address as the SIP address used for connecting to the SIP client part of the said software function 22.

In a subsequent step, the voice call is performed until either of the UEs 10, 20 hang up.

In a subsequent step, the method ends.

Regarding the forwarding phone number, this may belong to a phone number series of said first network 30. Hence, the VOIP service 40 may subscribe to a series of such phone numbers. The forwarding phone number may be a E.164 standard phone number, which is not possible for the MSC 31 to recognize as a forwarding number the intention of the use of which is to setup the voice call as a partly PS voice call.

In some embodiments, the forwarding phone number is a DID (Direct Inward Dial) phone number, previously specifically and uniquely associated, in the VOIP service 40, with the said receiving address of the callee UE 20.

As mentioned above, the receiving address comprises the callee phone number, a phone number which in turn is a standard E.164 phone number (an MSISDN of the callee UE 20 SIM card 21). Furthermore, the receiving address may be a SIP address. Such a SIP address is generally on the format "user@domain.tld", similar to the format of a conventional email address. Then, the "user" field of the receiving address may comprise, such as be entirely constituted by, the callee phone number. Similarly, the "domain" address may be set by the VOIP service 40. An example of such receiving address is "+46701234567@VOIP-service.se".

In order to support several concurrent callee electronic devices for receiving PS voice calls, a technique called AOR (Address Of Record) may be used. This will lead to a SIP proxy implementation of the VOIP service 40 not having to be modified as compared to the case in which there is only one configured callee UE 20. In particular, the callee MSISDN may be associated with AOR, as will be explained in the following.

AOR is a part of conventional SIP communication. The AOR is a high-level name assigned to a SIP entity without regard to the device or devices that may be denoted by the said name. The format for an AOR is as follows: SIP:user@domain.tld.

In general, when a SIP entity wishes to communicate with another SIP entity, it populates the SIP Request-URI and the "To" header with the recipient's AOR. It will also put its own AOR in the "From" header.

The AOR is suitable for high level routing, but it falls short when it comes to identifying the actual hardware device recipient of a SIP message. This is because the said name format user@domain.tld does not specify the particular device, or the particular devices, that the AOR may currently be associated with. For instance, one and the same AOR address can be registered for several hardware devices, such as a SIP telephone, a PC SIP software client and a SIP software client running on a mobile phone or tablet computer.

In order to translate from an AOR to a particular hardware device, the so-called SIP Contact Header may be used. The Contact Header allows a user to associate one or more hardware devices, identified using a respective IP address, to a single AOR. Each of those hardware devices will send, to a SIP service (such as a SIP registrar) its own REGISTER message and each REGISTER will contain a unique Contact Header.

For example, the Contact Header used by the REGISTER from a particular PC computer could look as follows: Contact: Johan Smith SIP:jsmith@192.168.0.14, while the Contact Header used by the REGISTER from a cell phone belonging to the same user may look as follows: Contact: John Smith SIP:jsmith@192.168.0.4.

It is noted how each of these Contact Headers uses a different IP address for the same user address field "jsmith". This allows a particular SIP registrar to support multiple hardware devices for a single user. Hence, if an incoming call is detected to an AOR used by this user SIP:jsmith@thedomain.com, both the PC computer and the cell phone will ring. There is no reason for the caller to ever know the actual IP addresses of these hardware devices. Furthermore, DNS routing will find thedomain.com and the SIP Session Manager will simultaneously alert all registered hardware devices of the incoming call.

Hence, in some embodiments the receiving address is an AOR (Address Of Record) address in which the "domain" field belongs to a SIP service. In this case, the method may further comprise registering at least two physical devices (at least one of which being the additional physical device 23) with the SIP service in question, each such hardware device having a unique SIP address with the same "user" field as the AOR address, but with their respective IP addresses as the "domain" field of the AOR. Then, in the step in which the VOIP service 40 initiates the call between the caller UE 10 and the said software function 22, this step comprises the VOIP service 40 directing the call between the caller UE 10 and each of said registered physical devices 20, 23. It is realized that the SIP service may be a part of the VOIP service 40, such as the SIP server 41.

In particular, the software function 22 may preferably be executed on or from each of said more than one registered physical devices 20, 23, and it may be the software function 22 which automatically registers said respective AOR address with the SIP service in question. It is noted while the callee UE 20 comprises a SIM card 21, the additional physical devices 23 may or may not each comprise a respective SIM card. Instead, each, or at least one of, such additional physical device 23 may be an Internet connected electronic device without a SIM card, capable of receiving not mobile telephony CS voice call but only of PS voice calls from the VOIP service 40. However, using the software function 22 such additional hardware devices will in fact work much as a regular CS cell phone, in a way which is transparent to the user at the time of initiating or receiving a call.

Hence, the SIP address of each additional device 23 may be set up with the MSISDN of the mobile subscriber of the callee UE 20. Then, additional Internet connected hardware devices 23 of various types can join this AOR.

In order to authenticate each of said physical devices, preferably both the callee UE 20 and the additional hardware devices 23, it is preferred that the SMS channel to the callee UE 20 SIM card is used. In particular, each such physical device 20; 23 may be authenticated to the VOIP service 40 using an SMS sent to the above-described callee phone number, which SMS comprises a code, such as a PIN number or any alphanumeric code, which in turn is used by a particular one of said physical devices 20; 23 to authenticate the physical device 20; 23 in question to the VOIP service 40. Different physical devices 20; 23 may use the same code or different codes. Hence, the SMS is sent to the callee UE 20, having therein the SIM card 21 tying the callee UE 20 to the first network 30.

In particular, it may be the association of the device 20, 23 in question to the MSISDN which is authenticated. To do this, the hardware device on or from which the software function 22 executes negotiates with the SIP server 41 the verification PIN sent through SMS to the caller UE 20. Preferably, this negotiation is performed over the Internet by the software function 22 after input into the hardware device in question, such as manually by the user of the callee UE 20. If the PIN is correct, the SIP database adds the hardware device in question, and in particular its IP address, to the pool identified by the AOR. Then, when a CS call is placed to the MSISDN of the callee UE 20, call forwarding will redirect it to the VOIP service. The call is then redirected to the configured AOR address. As a result, the call is redirected to all authenticated and registered devices 20; 23, and the user of the callee UE 20 can choose to answer the call from any one of these devices 20; 23.

In some embodiments, the call forwarding mentioned above may be automatically configured by the first network 30 for the callee UE 20 in connection to the initiation of the subscription of the callee UE 20 to the first network 30. In the alternative, or in addition such as at a later point, the said call forwarding may be manually configured by the user of the callee UE 20 using said software function 22 executing on or from the callee UE 20. Such call forwarding may also be automatically performed by the software function 22 due to the triggering of a timer, or any other automatically detected external or internal event.

It may also be so that the first network 30 and/or the software function 22 is arranged to automatically detect a roaming event of the callee UE 20, such as a roaming event of the callee UE 20 between a coverage area of the first network 30 and a second network, which is different form the first network 30. For instance, the first network 30 and/or the software function 22 may be arranged to automatically activate said call forwarding when the callee UE 22 is roaming in said second network, and to automatically inactivate the call forwarding when the callee UE is not roaming in said second network. For instance, the roaming event as such may trigger the activation or inactivation of the call forwarding. This way, the callee UE 20 may be configured to, automatically, always be reachable using the PS channel when roaming in visited networks but using the CS channel when in its home network, for received phone calls. As such incoming PS calls are forwarded to the forwarding phone number, being a phone number local to the first network 30, and since they are thereafter routed via the PS channel, tariffs are kept to a minimum both for a caller UE 10 subscribing to the first network and for the callee UE 20.

In a configuration phase of a method according to the present invention, the software function 22 is first provided on or to the callee UE 20. For instance, the software function 22 can be installed locally as an application on the callee UE 20, or it may be integrated as an integrated part of the operating system of the callee UE 20.

In a subsequent step, the software function 22 may automatically retrieve the MSISDN from the callee UE's 20 SIM card 21 (which in turn has been provided by the first network 30 MNO/MVNO). This MSISDN is stored in the above mentioned database of the software function 22, effectively being assigned to the software function 22 as, or as a part of, its SIP identity.

In a subsequent step, the software module contacts the SIP server 41 to register the receiving address, comprising the retrieved MSISDN, as a SIP address in the SIP database of the SIP server 41. It is realized that the software function 22 may also provide the MSISDN as such to the VOIP service 40, the latter then automatically using the received MSISDN to define a SIP address to use for the software function's 22 SIP client part.

In a subsequent step, the software module may receive a DID phone number from the VOIP service 40, being supplied by the VOIP service 40 and associated, in the VOIP service 40, with the callee UE 20.

Thereafter, the software function 22 may automatically activate, in the first network 30, unconditional call forwarding to the DID number in question.

This way, the configuration of the callee UE 20 as a callee UE 20 for use in a method according to the present invention may be performed completely automatically, and in a way which provides the services of the present method in a way which is completely transparent to a user of the callee UE 22, by the software function 22. All the said user has to do, essentially, is to activate/install the software function 22.

Additional devices 23 may be activated using the software function 22, via the said SMS authentication.

In particular, the software function 22 may be arranged to automatically detect the callee phone number from said SIM card 21, and to thereafter automatically provide to the VOIP service 40 the callee phone number and/or said receiving address.

In some embodiments, the software function 22 is arranged to also perform VOIP calls, such as to initiate and receive VOIP calls. The software function 22 may also be capable of performing CS calls, such as to initiate and receive CS calls. The user interface may even be one and the same, and the software function 22 may be arranged to, in a way which is transparent to a user of the callee UE 20, initiate a call based on a particular dialled phone number, as either a PS call or a CS call, such as based upon the response to a query posed by the software function 22 to the VOIP service 40 whether or not the dialled phone number is associated with the software function of a different UE. Hence, this way a dialled phone number may automatically result in a PS call if this channel is available, and if not so a CS call. Again, this may be performed in a way which is completely transparent to a user of the callee UE 20.

Moreover, the software function 22 may be configured to detect a first mobile internet connection provided via the SIM card 21 (such as LTE), as well as a second wireless internet connection not provided via the SIM card 21 (such as WiFi), and to selectively initiate a VOIP PS call over said first or second connections. For instance, if a second wireless internet connection is available, this second connection is used, and if not the first wireless internet connection is used as a secondary alternative.

As mentioned above, the software function preferably comprises a SIP client. Then, when the software function 22 initiates said VOIP PS calls from callee UE 20, it may do so based upon said receiving address.

As mentioned above, the VOIP service 40 may comprise the SIP server 41, which in turn is arranged to receive the call forwarded by the MSC 31, and further being arranged to initiate the call as a VOIP PS call to the callee UE 20.

As also mentioned above, the VOIP service 40 may further comprise the SBC 42, in turn being arranged to connect the first network 30 to the said SIP server 41.

Moreover, the said forwarding function may be configured in the MSC node 31 of the first network 30.

Also, the call forwarding may take place by the MSC 31 communicating with the VOIP service 40 via the GMSC of the first network 30.

FIG. 9 illustrates a second method according to the present invention, for initiating a mobile voice call from a caller UE to a callee UE. This second method is performed by the same system as the first method, but in this second case the UE 20 initiates a call to the UE 10, rather than the other way around. Hence, in this case the PS-enabled UE 20 assumes the role of the caller UE, while the CS-enabled UE 10 assumes the role of the callee UE.

In a first step, the method starts.

In a subsequent step, the above described software function 22 is provided to the caller UE 20, and arranged to execute on or from the caller UE 20.

In a subsequent step, the caller UE 20, using said software function 22, selects a callee UE 10 phone number, which callee UE 10 phone number is compliant with the phone number recommendation E.164. This phone number may be the MSISDN of the callee UE 10, as associated with a SIM card installed in the callee UE 10.

In a subsequent step, the caller UE 20 communicates, to the SIP server 41, the said callee phone number. This communication may take place by the software function 22 automatically, in a way which is transparent to a user of the caller UE 20.

In a subsequent step, the SIP server 41 in turn determines whether or not the communicated callee phone number is associated with a callee UE for VOIP, in other words if there is a UE which has previously been registered with the SIP server 41 for VOIP voice call services using a SIP address comprising the callee phone number. For instance, such a SIP address may comprise the callee phone number in the "user" field, as described above. It is noted that it may be the software function 22 executing on or from the callee UE 10 which may have been configured for PS call reception with the SIP server 41, in the software function's 22 capacity as a SIP client.

If this is indeed the case, the SIP server 41 in a subsequent step identifies the callee UE 10 using the SIP address of said type, such as in which the "user" field of the SIP address comprises the callee phone number in question. As a result, the SIP server 41 then initiates the call between the caller UE 20 and the callee UE 10 as a VOIP call. It is noted that this call takes place in its entirety as a PS call, without any CS call leg.

If, however, the said determination does not turn out in the positive, in other words that there is no UE associated in the SIP server 41 with said callee phone number, the SIP server 41 instead initiates the call between the caller UE 20 and the callee UE 10 as a CS call using the callee phone number as MSISDN and using a network switching function of the first network 30 to which the callee UE 10 subscribes. It is realized that this call may comprise a PS leg, between the caller UE 20 and the VOIP service 40, as well as a CS leg, between the VOIP service 40, via the first network 30 and finally the callee UE 10.

Moreover, the invention relates to a system of the above described type, arranged to initiate a mobile voice call from the caller UE 10; 20 to the callee UE 20;10. Such a system comprises the said one or several executable instances of the said software function 22, each arranged to be executed on or from a respective one of the said callee UEs 20; 10, and possibly also on or from one or several of the said respective caller UE 10; 20. The system also comprises the said VOIP service 40, arranged to accept CS voice calls forwarded to the said forwarding phone number from the first network 30 to the VOIP service 40.

In particular, the said software function 22 is arranged to, when executing, automatically detect the callee phone number from the SIM card 21 of the UE in question on or from which it executes, and thereafter to automatically provide the VOIP service 40 with the detected callee phone number and/or the receiving address comprising the callee phone number.

Moreover, the VOIP service 40 is arranged to identify the callee UE 20; 10 based upon the forwarding phone number, and to, as a result of this identification, initiate the call between the caller UE 10; 20 and the said software function 22, using the receiving address.

The invention also relates to the software function 22 as such.

As described above, the software function 22 is arranged to, when executing, detect the callee phone number from said SIM card 21, and then to provide the VOIP service 40 with the callee phone number and/or the receiving address comprising the callee phone number as described above.

The software function 22 is also arranged to receive the forwarding phone number from the VOIP service 40, and then to automatically configure a call forwarding function in the first network 30 to which the callee UE 20 subscribes, which call forwarding function is activated for the said callee phone number and configured for forwarding CS voice calls to the forwarding phone number.

Using the software function 22 according to the present invention, and in particular using the above-described database functioning as a "virtual SIM", results in a number of advantages.

Firstly, the "real" MSISDN, in other words the E.164 phone number, is provided to the callee UE 20 the mobile operator or HPLMN operating the first network 30. Therefore, a single and simple customer relationship and ownership between HPLMN and their clients will be facilitated, requiring no intermediary database, providers, mobile operators, VOIP providers, and so forth.

Secondly, it will be possible to implement personal communications mapping between such a HPLMN to an end-user. In other words, the "real" phone number provided by the HPLMN can be used, according to the present invention, as a global address and personal identifier for any personal communications, including voice, text messages and so forth.

Thirdly, customer ownership and relationship related aspects will remain simple and unique to the HPLMN, including billing, identification, confidential information, and so forth.

Fourthly, the present system and method is also useful for, in the corresponding manner, transmitting SMS and UMS (Unified Messaging System) messages between a caller UE 10; 20 and a callee UE 20; 10. Hence, using the present invention such SMS and UMS messages can be received globally in any type of processing devices, even those lacking a SIM card.

Moreover, using the present invention there is no need for an SS7-based roaming interconnection according to 3GPP. The UE on or from which the software function executes, and that roams outside of its HPLMN will be reached through the VOIP service 40 to which it subscribes. The roaming mechanism according to 3GPP will be limited to the access part only. When a UE is in roaming state, it will be registered as a visitor in the MSC or MME or a visitor network.

Furthermore, the inventive system and method offers global reachability. A mobile user can be reached using its "normal", global, MSISDN through any type of a processing device, even such devices that as such lack a SIM card.

Also, in the specific case of 3GPP IMS, the CS initiated calls will not be routed to the callee UE 20 through CS but to the VOIP service in IMS. The establishment of a call between a CS-enabled UE and a PS-enabled UE is established through the IMS system.

In practise when implementing the present invention, the "virtual SIM" as embodied by said database of said software function 22 may use, as its "phone number" the same E.164 MSISDN-type number as the SIM card 21 of the UE in question.

Furthermore, the same software dialler (user interface) in caller UE 10; 20 may be used for the establishment of CS voice calls and VOIP services such as VS voice calls, in a way which is transparent to a user of the UE in question as described above, for instance by the system automatically determining if a CS or a PS call is to be established for a particular dialled number.

This way, the "phone number" of the "virtual SIM" may be considered as global number, which can be reached globally without activating the roaming system according to 3GPP.

Using the present method and system, a user of a UE can be reached by the global MSISDN of the user in question, through any electronic device which contains a processor and an operating system and has access to the Internet by any means such as WiFi, 3G and LTE. This is done by simply activating and configuring the software function from the UE in question, as has been described above. The MSISDN in question is provided by a mobile operator, in relation to a real SIM card 21, in the conventional way.

It is realized that the present invention relates primarily to the setup of voice calls, and potentially also to the sending of SMS and UMS messages. The initiation and performance of other non-voice communications, such as specific data-only communications (for instance streaming of moving images and similar), is not covered by the methods and systems described herein. Also, the performing of the actual voice call, in other words the sending of data coding for the actual sounds constituting the voice calls, will take place in the conventional way.

In some embodiments of the method according to the present invention, the software function provided for executing on or from the callee UE 20 may be arranged to register the callee UE 20 with the mobile network to which the callee UE 20 is a subscriber, such as to an MSC of this mobile network, and this MSC will then as a result associate the UE 20 as a UE for which incoming CS calls will be forwarded to a VOIP system for call termination. The same software function 22 may also be arranged to register the callee UE 20 with said VOIP system, as a user of said VOIP system. These registration steps may be taken automatically by the software function 22, such as upon download and activation in the callee UE 20.

Both said MSC and said VOIP may identify the callee UE 20 by an MSISDN or IMSI of the callee UE 20. Each of the MSC and the VOIP may use an identifying code comprising said MSISDN and/or IMSI, such as said MSISDN with an additional number code appended thereto. Hence, the VOIP system may identify the software function, and as a result the callee UE 20, using the above mentioned receiving address in turn comprising or being the callee phone number.

Figure 11:
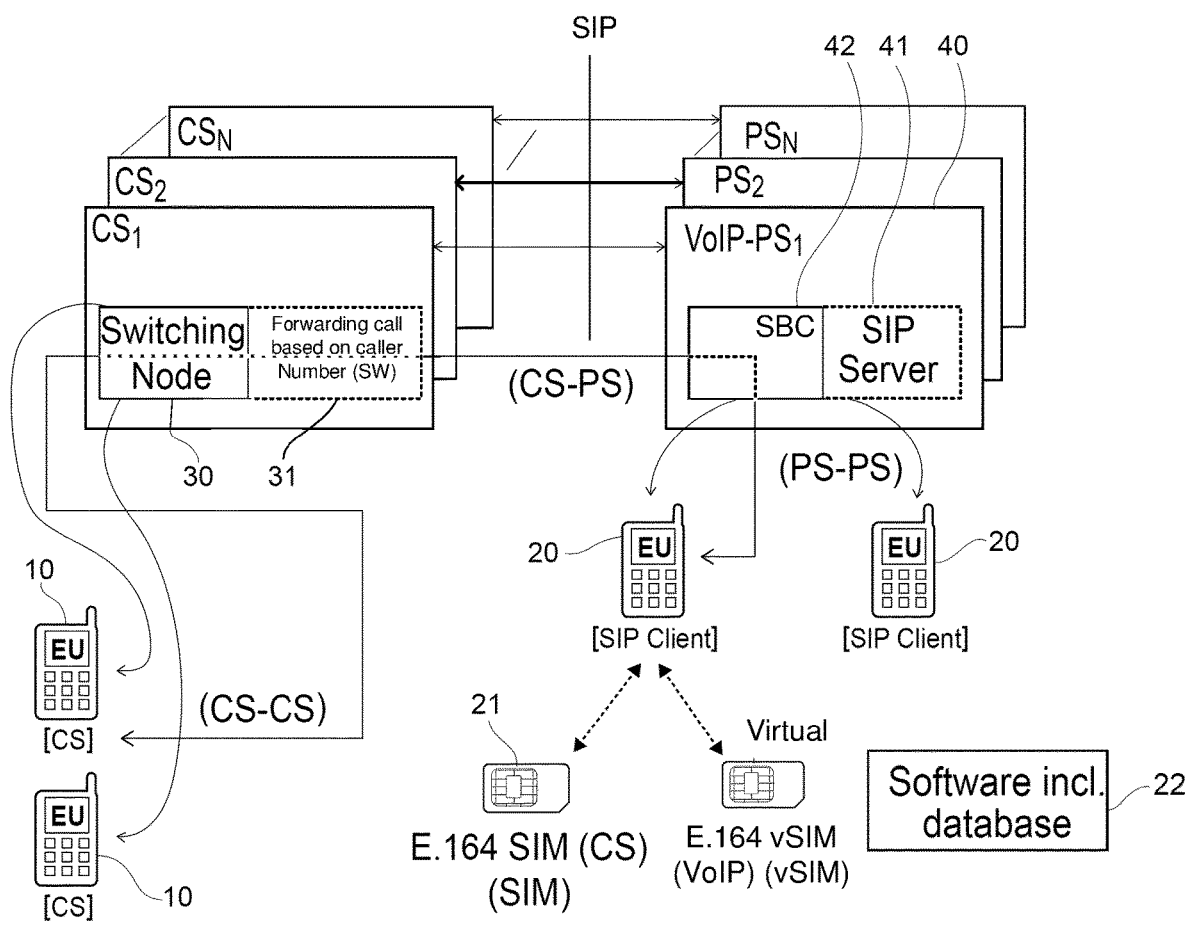
FIG. 11 corresponds to FIG. 5 but illustrates a system according to the present invention when configured for a method illustrated in FIG. 10.

In some embodiments, a software module may be provided to a mobile network to which the callee UE 20 is currently connected, such as to a CS mobile network to which the callee UE 20 subscribes and/or in which the callee UE 20 is currently roaming. For instance, a software function 31 (see FIG. 11) may be provided to execute in the MSC of such a CS mobile network. This software function 31 is then arranged to perform the function of forwarding (routing) the call to said VOIP system, in which case the VOIP system terminates the call towards the callee UE 20 (the B-number). The VOIP server may be or comprise a SIP server. Said forwarding may take place using the callee UE 20 phone number, as exemplified below.

The software function 31 in the CS network or MSC may contain a database in which all MSC subscribers that have been registered as users of the present method, and for which termination of incoming calls should be handled by the VOIP system, are stored. Such a database may also comprise information regarding under what circumstances incoming calls should be forwarded to, and handled by, the VOIP system. For instance, the database may comprise information that such forwarding should take place whenever (such as exclusively when) the user's UE (the callee UE 20) is roaming outside the UE:s HPLMN (Home PLMN).

It is understood that said software function 31 may execute inside the switching node MSC itself, or on a dedicated server. Similarly, said database may be standalone or part of the mobile system HLR/HSS.

As mentioned, mobile users may be registered (as identified by their phone numbers) in both the VOIP system and in the CS network. For instance, such users may be associated with a special flag in said database, which flag is then used when determining if call forwarding should be performed or not for a particular incoming call to the registered user in question (the user then being the callee).

Then, the software function 31 executing in the CS mobile network may check if the terminating callee number is registered to the service, and if any special requirements (such as that the callee UE 20 is currently roaming outside of its HPLMN, that the callee UE 20 is currently located in a particular predetermined location, and/or any other suitable, predetermined conditions that can be determined by the mobile network operator in question) are currently fulfilled. If this check turns out in the positive, then the software function 31 forwards the call to the VOIP server. If the check turns out in the negative, the software function 31 does nothing, or informs the MSC in question that this call should be switched as a normal circuit switch call.

It is understood that one way of providing the call forwarding function according to the invention is to register a conventional call forwarding function in the CS network, which call forwarding function is simply arranged to unconditionally forward an incoming CS call to a specified MSISDN as a CS call. This forwarded CS call then finally terminates in a VOIP server, such as using one of the above-described mechanism (such as using a DID number).

It is further understood that another way of providing the call forwarding function according to the invention is to use said software function 31 executing in the CS network, such as in said MSC. Then, the registration of the callee with said software function 31 as an active/configured user to the service (such as configuring said flag in said database) constitutes a setup of the call forwarding function according to the invention.

The call forwarding may also be unconditional, either in the sense that the call forwarding will always be performed or that it will always be performed for a roaming callee UE 20. Hence, the forwarding may be unconditional once configured. In particular, the unconditional call forwarding may be activated/configured when the callee UE 20 enters roaming, and be inactivated/unconfigured when the callee UE 20 returns to its HPLMN.

Hence, the call forwarding function described herein may be configured in the first network 30 to which the callee UE 20 subscribes, by providing said software function 22 to the callee UE 22 and (said software function 22) registering the callee UE 20 as a subscriber to the service (with the CS network software and the VOIP server). In particular, the call forwarding function is then activated for said callee UE 20 phone number and configured for forwarding CS voice calls to a forwarding phone number associated with a defined VOIP service 40.

The forwarding number may in this case be a SIP address or other address identifiable by the VOIP service 40, which address may for instance be or comprise the callee UE 20 MSISDN.

Then, in connection to the call initiating, as the caller UE 10 calls the callee UE 20 phone number, said first network 30 may perform said (unconditional) call forwarding by the software function 31 identifying the callee UE 20 as a registered user as described above and forwarding the incoming call to said VOIP service 40 using said forwarding phone number.

The VOIP service 40 may in turn identify the callee UE 20 based upon the forwarding phone number, such as via the registration of the callee UE 20 performed initially by the software function 22 executing on or from the callee UE 20 as described above. Again, the forwarding number may be or comprise the callee UE 20 MSISDN, which number may then have been used by the callee UE 20 software function 22 to register the callee UE 20 with the CS software function 31.

Then, the VOIP service 40 may initiate the forwarded call between the caller UE 10 and the software function 22 of the callee UE 20, using above mentioned receiving address.

Figure 10:
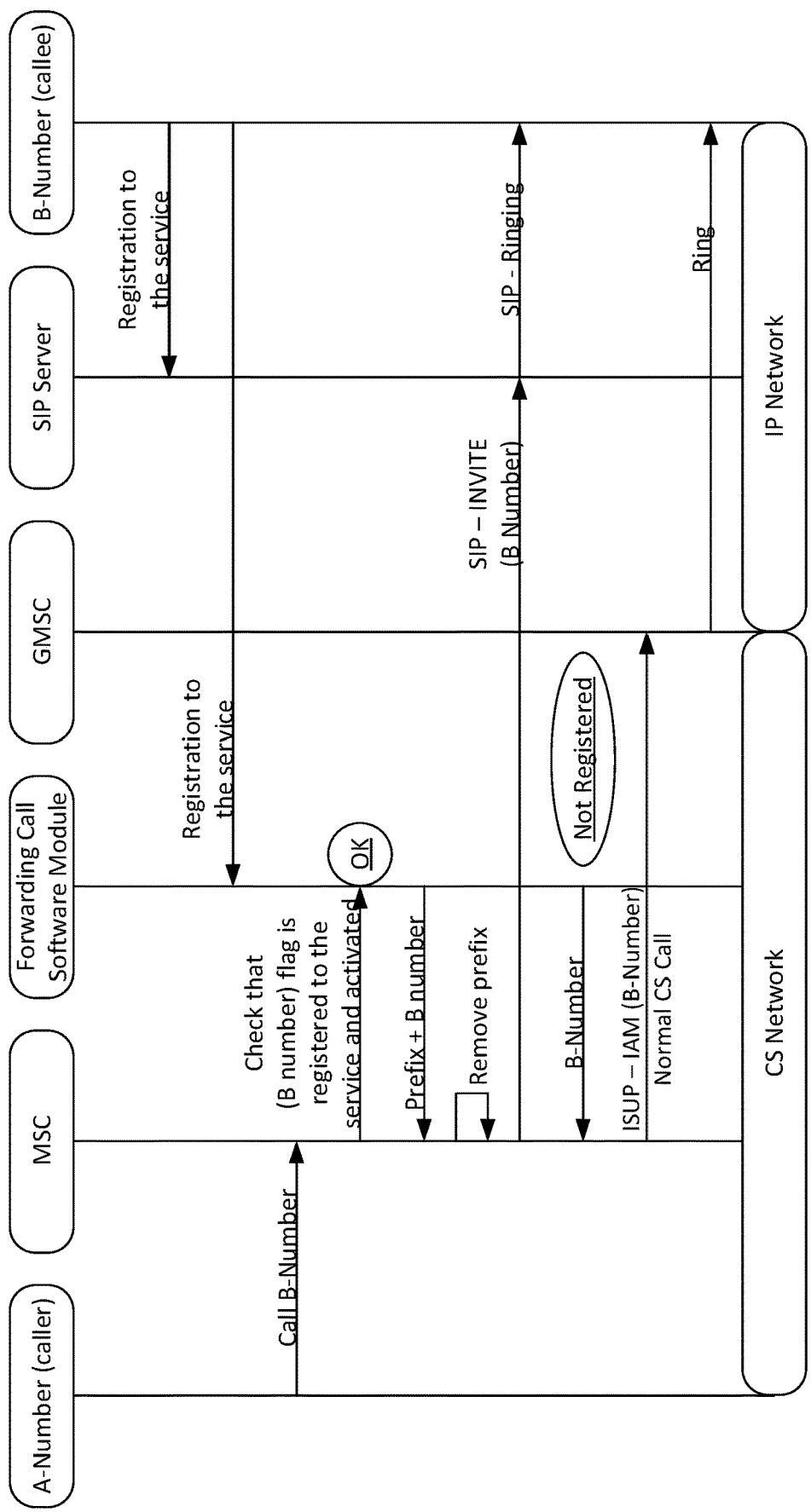
FIG. 10 is a sequence diagram of a third method according to the present invention.

One particular example of such an embodiment is illustrated in FIG. 10.

Initially, the callee UE 20 software function 22 registers with a SIP server as well as with said software function 31 executing in the CS network.

Then, the MNO MSC receives a request from A-number (the caller UE 10 MSISDN) to call a B-number (the callee UE 20 MSISDN). The software function 31 executing in said MSC recognizes that the subscriber identified by the B-number has a flag set in the database, indicating that the B number is registered to the service and has its software client function 22 activated. Then, the software function 31 in the MSC of the CS network will modify the B-number, such as by adding more digits to the B-number, in order to mark the B-number for further processing by the MSC. Such a modification may, for instance, be in the form of a prefix or a suffix to the B-number. In the present example, the addition is in the form of a prefix. For instance, if the B-number is 0011234567, the modified B-number may be 990011234567, where the prefix "99" has been added.

Then, the modified B-number is sent back to the MSC. Once the MSC receives the modified B-number, it will route the call through a gateway interfacing the SIP network. This routing may take place using the SIP protocol.

In practise, when the MSC receives said request to call the callee UE 20 B-number, the MSC interrogates the software function 31 if the B-number is registered to the service and activated. This could be done by using the CAMEL protocol Ph2 IDP (Customised Applications for Mobile network Enhanced Logic). If the callee UE 20 has an active service set in the software function 31, then the software function 31 adds said prefix to the B-number and sends it back to MSC in the IDP result message. Once the MSC receives this prefix it removes the prefix and then route the call to the VOIP server.

CAMEL was developed as a standard for mobile intelligence across different vendor equipments for GSM networks. Using CAMEL, the end user is able to roam between different networks (in same or different countries), be reachable at the same MSISDN and receive only one bill from the original service provider (Home Operator).

Using the CAMEL standard protocol, the software function 31 in the first network can be implemented as a separate software entity in the first network to fulfil the service of routing or forwarding of the call, interworking with the MSC(s) via CAMEL. It is realised that other protocols and communication mechanisms may also be useful to achieve such a separate software entity.

By the use of such a prefix, the MSC can use existing routing functionality, since the prefix itself can be used to identify the SIP network as a conventional CS voice call recipient. Alternatively, the MSC may first remove the addition to the B-number (the prefix) before forwarding the call to the gateway.

If the B-number does not have said call forward flag set in the database, the software function 31 executing in the CS network will not add a prefix to the B-number, which will cause the MSC to route the call towards the circuit switch gateway, such as the traditional international gateways (GMSC).

Hence, the call forwarding function may be configured by registering the callee UE 20 as an active user in a software function 31 executing in the first network 30, and the call forwarding may be performed by said software function 31.

Furthermore, the call forwarding is performed by said software function 31 identifying the callee UE 20 as an active user as described above and either forwards the incoming call to said VOIP service 40 or adding a prefix to a B-number of the callee ID and invoking the first network 10 for routing the call based on said prefix.

The software function 31 executing in the CS network may cooperate with the VOIP system for configuration, registration, activation and deactivation of the call forwarding to the VOIP system. This may be achieved via defined APIs (Application Programming Interface) provided by said software function 31 executing in the CS network. The following is a non-exclusive list of examples of such interface services and such cooperation.

Authorization API: Checking the MSISDN of the callee UE 20 assigned to the software function 22 executing on or from the callee UE 20, and updating said database by verifying MSISDN as a valid MSISDN subscriber to the service.

Registration API: Registration of the callee UE 20 MSISDN to the software function 31 executing in the CS network and checking that said MSISDN is authorized by the MNO.

Enable/disable call forwarding/rerouting API: This API is used to communicate between the VOIP server and the software function 31 executing in the CS network to enable/disable the call forwarding for the callee UE 20 MSISDN.

Charging and CDR update API: Implementing the rating/charging mechanism via an API between the software function 31 executing in the CS network and the VOIP server. Transfer the CDR (Call Data Register) to the MNO by sending the A-number, B-number and number of minutes to be paid in advance. MNO will respond by approving or denying the request.

In contrast to a conventional OTT VOIP service, such an implementation of the present invention provides full control to the MNO while being able to maintain the same security requirements imposed by regulators.

Also, the termination call costs may be minimized since the CS call may be configured, such as in said database, to be forwarded to the VOIP system in case the callee UE 20 is roaming outside its HPLMN, such as unconditionally during such roaming.

At the same time, the callee UE 20 can be globally and seamlessly reached through its normal MSISDN, which may be used in or as the VOIP service registration number and also in or as said forwarding number as described above. This reachability can easily extended to several concurrent devices (cellphone, tablet, browser, etc.) by registering several such devices in the VOIP server and providing execution of said software function 22 on several such devices.

Above, preferred embodiments have been described. However, it is apparent to the skilled person that many modifications can be made to the disclosed embodiments without departing from the basic idea of the invention.

For instance, the system described above may comprise many additional features. It may, for instance, be applied in call conferences (involving more than two voice communicating parties) and one-way voice messages, applying the same principles as described above. It is also applicable in any voice-centric mobile communication system, such as 2G, 3G, LTE, 5G systems and beyond.

In general, everything which has been said herein about the system, the methods and the software function according to the present invention is readily and directly applicable between these aspects of the invention.

Hence, the invention is not limited to the described embodiments, but can be varied within the scope of the enclosed claims.

The invention claimed is:

1. Method for initiating a mobile voice call from a caller user equipment (UE) to a callee UE, having a subscriber identity module (SIM) card associated with a callee phone number, which callee phone number is a E.164 compliant Mobile Station International Subscriber Directory Number (MSISDN) of the SIM card, which method comprises the following steps, performed ahead of the said call initiating:
a) providing a software function arranged to execute on or from the callee UE, which software function is associated with a receiving address, which receiving address comprises the said callee phone number; and
b) configuring a call forwarding function in a first network to which the callee UE subscribes, which call forwarding function is activated for the said callee phone number and configured for forwarding circuit switch (CS) voice calls to a forwarding phone number associated with a voice over internet protocol VOIP service, and wherein the method further comprises the following steps, performed in connection to the said call initiating:
c) the caller UE calling the callee phone number;
d) the first network performing said call forwarding, forwarding the call to said VOIP service using said forwarding phone number;
e) the VOIP service identifying the callee UE based upon the forwarding phone number; and
f) the VOIP service initiating the call between the caller UE and the said software function, using the receiving address,
wherein the receiving address is a session initiation protocol (SIP) address in which the "user" field comprises the callee phone number.

2. Method according to claim 1, wherein the forwarding phone number belongs to a phone number series of said first network.

3. Method according to claim 1, wherein the forwarding phone number is a direct inward dial (DID) phone number previously specifically and uniquely associated with the said receiving address.

4. Method according to claim 1, wherein the call forwarding function is configured by registering the callee UE as an active user in the software function executing in the first network, and in that the call forwarding is performed by said software function.

5. Method according to claim 4, wherein the call forwarding is performed by said software function identifying the callee UE as an active user as described above and either forwards the incoming call to said VOIP service or adding a prefix to a B-number of the callee (ID) and invoking the first network for routing the call based on said prefix.

6. Method according to claim 1, wherein the receiving address is an address of record (AOR) address in which a "domain" field belongs to a SIP service, wherein the method further comprises registering at least two physical devices with the SIP service each having a unique SIP address with the same "user" field as the AOR address but with their respective IP addresses as the "domain" field, and wherein step f) comprises the VOIP service directing the call between the caller UE and each of said registered physical devices.

7. Method according to claim 6, wherein said software function is executed on or from each of said registered physical devices, and wherein it is the software function which automatically registers said respective AOR address.

8. Method according to claims 6, wherein each of said physical devices is authenticated to the VOIP service using a short message service (SMS) sent to the callee phone number, which SMS comprises a code which is used by a particular one of said physical devices to authenticate the physical device in question to the VOIP service.

9. Method according to claim 1, wherein the call forwarding is automatically configured by the first network for the callee UE in connection to initiation of subscription of the callee UE to the first network, and/or wherein the call forwarding is automatically activated, by the first network or by the said software function, when the callee UE is roaming in a second network, which is different from the first network and is automatically inactivated when the callee UE is not roaming.

10. Method according to claim 1, wherein said software function automatically detects the callee phone number from said SIM card, and thereafter automatically provides said VOIP service with the callee phone number and/or said receiving address.

11. Method according to claim 1, wherein said software function is configured to execute on or from the callee UE, which software function is arranged to perform VOIP calls, and which software function is also capable of performing CS calls.

12. Method according to claim 11, wherein the software function is a SIP client, arranged to initiate VOIP calls from said callee UE based upon said receiving address.

13. Method according to claim 1, wherein the VOIP service comprises a SIP server receiving the forwarded call, and further initiating the call as a VOIP call to the callee UE.

14. Method for initiating a mobile voice call from a caller user equipment (UE) to a callee UE, comprising the following steps:
a) providing to the caller UE a software function arranged to execute on or from the caller UE;
b) the caller, using said software function, selecting a callee phone number compliant with the phone number recommendation E.164;
c) the caller UE communicating, to a session initiation protocol (SIP) server, the callee phone number;
d) the SIP server (41) determining whether or not the callee phone number is associated with a callee UE for voice over internet protocol (VOIP);
e) if so, the SIP server identifying the callee UE using a SIP address the "user" field of which comprises the callee phone number, initiating the call between the caller UE and the callee UE as a VOIP call; and
f) if not, the SIP server initiating the call between the caller UE and the callee UE as a circuit switch (CS) call using the callee phone number and using a network switching function of a first network to which the callee UE subscribes.

15. System for initiating a mobile voice call from a caller user equipment (UE) to a callee UE, which callee UE has a subscriber identity module (SIM) card associated with a callee phone number, which callee phone number is a E.164 compliant Mobile Station International Subscriber Directory Number (MSISDN) of the SIM card, which system comprises:
- a software function, arranged to execute on or from the callee UE; and
- a voice over internet protocol (VOIP) service arranged to accept circuit switch (CS) voice calls forwarded to a forwarding phone number from a first network to which the callee UE subscribes to the VOIP service,
- wherein the software function is arranged to, when executing, automatically detect the callee phone number from said SIM card, and thereafter automatically to provide the VOIP service with the callee phone number and/or a receiving address comprising the callee phone number,
- wherein the VOIP service is arranged to identify the callee UE based upon the forwarding phone number, and to, as a result of this identification, initiate the call between the caller UE and the said software function, using the receiving address, and
- wherein the receiving address is a session initiation protocol (SIP) address in which the "user" field comprises the callee phone number.

\* \* \* \* \*